June 28, 1960  J. C. MACY  2,942,499
AUTOMATIC SPEED VARYING MECHANISM FOR MACHINE TOOLS
Filed June 18, 1958  4 Sheets-Sheet 1

INVENTOR
JAMES C. MACY

BY Charles L. Sturtevant
ATTORNEY

June 28, 1960 J. C. MACY 2,942,499
AUTOMATIC SPEED VARYING MECHANISM FOR MACHINE TOOLS
Filed June 18, 1958 4 Sheets-Sheet 2

INVENTOR
JAMES C. MACY
BY Charles L. Sturtevant
ATTORNEY

June 28, 1960  J. C. MACY  2,942,499
AUTOMATIC SPEED VARYING MECHANISM FOR MACHINE TOOLS
Filed June 18, 1958  4 Sheets-Sheet 3
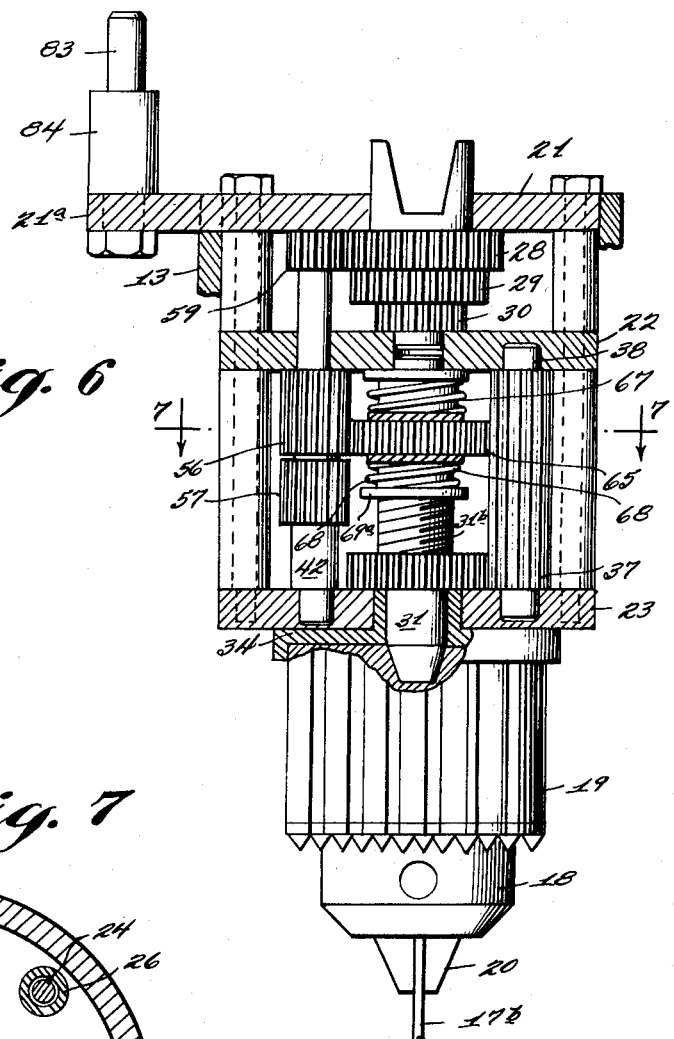
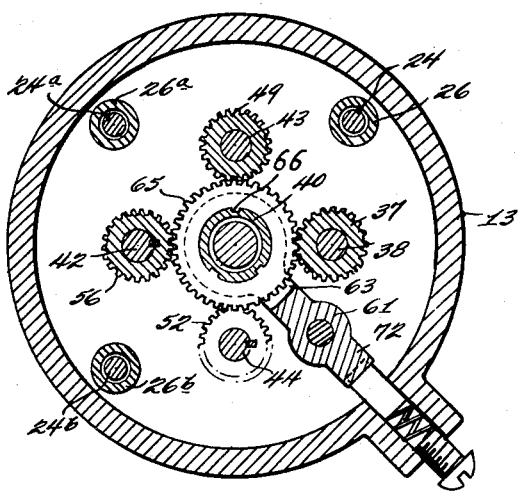
INVENTOR
JAMES C. MACY
BY Charles L. Sturtevant
ATTORNEY June 28, 1960 J. C. MACY 2,942,499
AUTOMATIC SPEED VARYING MECHANISM FOR MACHINE TOOLS
Filed June 18, 1958 4 Sheets-Sheet 4

INVENTOR
JAMES C. MACY
BY Charles L. Sturtevant
ATTORNEY

United States Patent Office 2,942,499
Patented June 28, 1960

2,942,499
AUTOMATIC SPEED VARYING MECHANISM FOR MACHINE TOOLS

James C. Macy, 25 S. Wickom Drive, Westfield, N.J.
Filed June 18, 1958, Ser. No. 741,529
20 Claims. (Cl. 77—5)

The present invention relates to new and useful improvements in machine tools and to the operation thereof in a manner such that a tool or workpiece may be rotated at speeds which are automatically predetermined with respect to the particular size of the tool or workpiece and more particularly to such improvements in means for automatically predetermining the speed of rotation in accordance with the position of gripping means, as for instance, the gripping jaws of a chuck, in gripping engagement with the particular tool or workpiece.

By way of example, the invention will be described with respect to drilling machines, such as a drill press, but the invention is equally applicable to other machine tools, such as milling machines or the like, where it is desirable to rotate the workpiece at preselected speeds for optimum results. In metal working operations, and perhaps particularly drilling operations, it is desirable to rotate drills of different sizes at different speeds for most efficient results and to minimize damage to the drills. Thus, in the drilling of different sized holes, it is necessary to constantly change the drills and the speed of rotation of each drill should be correspondingly changed. Heretofore, except where special drill shanks have been provided, the speed of the drill spindle has been changed under manual control of an operator.

With the above in mind, the principal object of the present invention is to provide a machine tool, such as a drill press, wherein the clamping of the drill or other tool in the chuck will automatically set the machine to proper speed of rotation for that particular tool or drill.

Another object of the invention is to provide a machine tool substantially of the above type, wherein the position of the clamping jaws of a chuck or the like in engagement with the tool or drill will automatically predetermine the speed at which the chuck is driven for that particular tool or drill.

A further object of the invention is to provide a machine tool substantially of the above type, wherein a variable speed mechanism is included between the chuck and the drill spindle and which variable speed mechanism is automatically set to a predetermined speed in accordance with the position of the chuck jaws in clamping variously sized tools or drills therein.

A still further object of the invention is to provide a composite chuck and variable speed attachment device which may be conveniently employed with existing machine tools, such as drill presses and the like.

The invention still further aims to provide a device of the above type which is relatively simple to manufacture, which is extremely compact in design to occupy a minimum of additional space in an existing machine, and which is thoroughly reliable in operation without danger of the chuck jaws becoming loosened.

The above and other objects of the invention will in part be obvious and will be hereinafter more fully pointed out.

In the accompanying drawings:

Fig. 6 is a view, also similar to Fig. 2, but showing the device turned ninety degrees on its vertical axis and with the front countershaft removed to illustrate the position of the train of gearing for rotating a very small size drill at a further increased speed, this figure also showing the mounting bracket for attachment to the drill press spindle supporting bracket or the like;

Fig. 7 is a sectional view taken substantially along the line 7—7 of Fig. 6;

Figure 1:
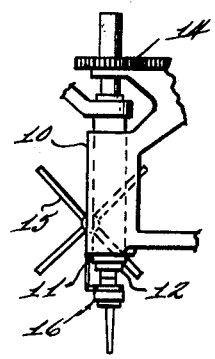
Fig. 1 is a fragmentary side elevation of a machine tool in the nature of a drill press having the attachment of this invention applied thereto.

Referring more in detail to the accompanying drawings, and particularly to Fig. 1 at this time, there is shown a fragmentary portion of a drill press wherein the bracket 10 supports the drill spindle sleeve 11 within which is mounted the drill spindle 12 having a drive connection at its upper end, such as gearing 14, belts or the like. The spindle sleeve 11 may be shifted vertically in known manner by a hand wheel 15 or the like. The lower end of the drill spindle 12 is adapted for connection to the attachment 16 which constitutes the composite variable speed mechanism and chuck device of the present invention.

Figure 2:
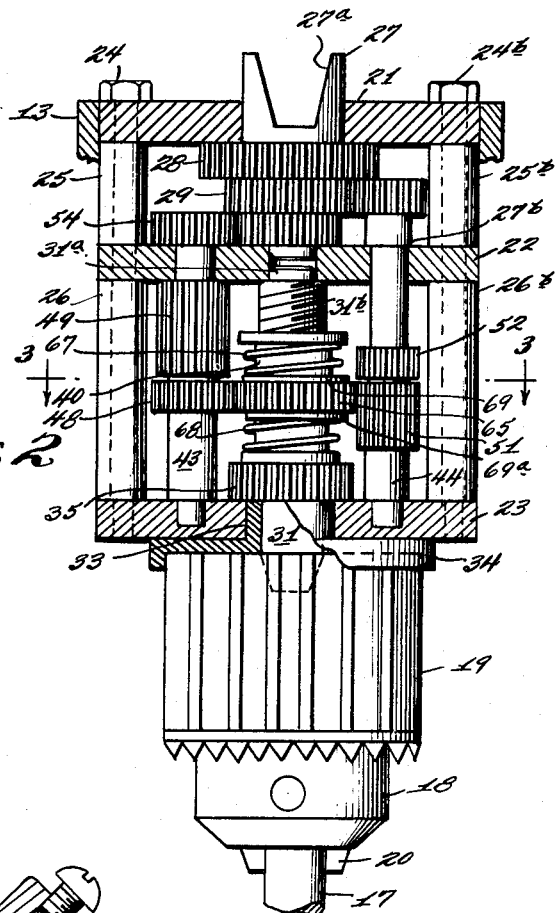
Fig. 2 is a side elevation of the chuck and variable speed drive, with the housing partially removed and with the front countershaft removed to more clearly show the relative position of the train of gearing for rotating a relatively large drill at a relatively slow speed.
Figure 3:
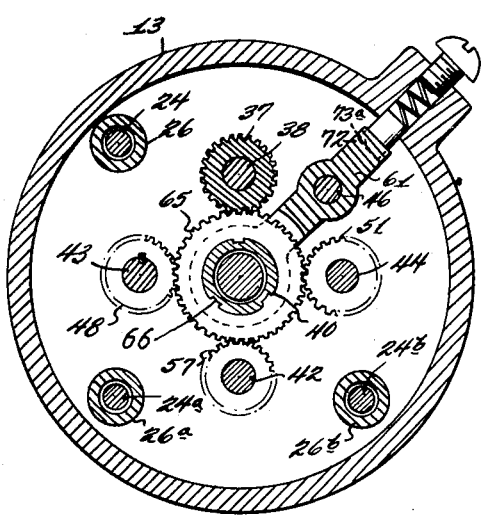
Fig. 3 is a sectional view taken substantially along the line 3—3 of Fig. 2.

In Figs. 2 and 3 the position of the gearing is illustrated for rotating a relatively large size drill at a speed, as for example, of 400 r.p.m. and portions of the housing 13 are removed for this purpose. Thus, in Fig. 2, a relatively large drill 17 is shown positioned within the chuck body 18 after adjustment of the chuck adjusting sleeve 19 to position the gripping jaws 20 in clamping engagement with the end or stem of the drill 17. Still referring to Fig. 2, the variable speed mechanism is mounted above the chuck device by means of an upper plate 21, an intermediate plate 22 and a bottom plate 23 which are secured together by angularly spaced tie rods 24, 24a, 24b and maintained in the illustrated spaced relationship by suitable upper spacing sleeves 25, 25a, 25b and lower spacing sleeves 26, 26a, 26b around each of the corresponding tie rods.

The upper plate 21 is centrally apertured to receive the driving shaft 27 having a recess 27a to provide a driving connection with the drill press spindle. The opposite end 27b of the driving shaft 27 is journaled in the intermediate plate 22 and both this plate and the plate 21 may be provided with suitable bearings (not shown) for the driving shaft. The intermediate portion of the driving shaft 27 carries a stack of stepped gears 28, 29, 30 between the plates 21, 22. Any number of gears may be provided but for simplicity of description and illustration, only three such driving gears of different diameters are shown.

A driven shaft 31 has its upper end 31a also journaled in the intermediate plate 22 and the lower end thereof passing through a sleeve portion 33 on an adaptor plate 34 and socketed with respect to the chuck device for driving the same. The adaptor plate 34 has affixed to the sleeve portion 33 thereof, as by welding, a gear 35 free on the driven shaft 31 so that this gear is fixed through the adaptor plate 34 to the chuck adjusting sleeve 19. This gear 35 is in constant mesh with an elongated pinion gear 37 which traverses the distance between the plates 22 and 23 and is mounted on a shaft 38 journaled therein, as particularly illustrated in Fig. 6. The driven shaft 31 is threaded throughout its exterior extent between the gear 35 and the plate 22 and this threaded portion 31b engages a complemental internal thread on a shiftable spool element 40 which is of a length less than the length of the shaft 31 between the plate 22 and gear 35 so that the spool can be shifted therealong for the purposes to be pointed out hereinafter.

Figure 8:
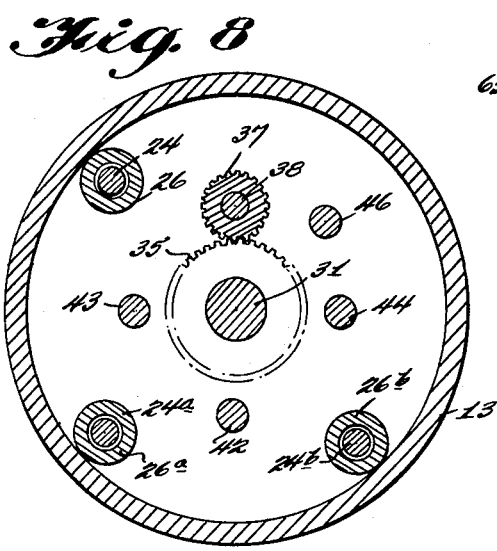
Fig. 8 is a sectional view, taken along the line 8—8, of Fig. 4, to show locations of the shafts and the rods relative to the center axis of the driving and driven shafts.

Reference is now made to Fig. 8 primarily for the purpose of showing the relative positions of additional shafts around the center axes of the driving and driven shafts and their positions relative to the tie rods. Thus, shaft 42 is diametrically opposed to the shaft 38 carrying the elongated pinion gear 37. Shafts 43 and 44 are diametrically opposed to one another and disposed so that each of the shafts 38, 44, 42 and 43 are arranged in substantial quadrature. Offset outwardly with respect to the peripheral positioning of the above-mentioned shafts, there is a stud 46 positioned between the shafts 38, 44 and the purpose of this stud 46 will be referred to hereinafter.

With reference to Figs. 2 through 5, it will be seen that the shaft 43 has keyed thereto and intermediate the ends thereof a gear 48. Above this keyed gear 48, there is a somewhat elongated gear 49 which idles on the shaft 43. It will also be seen that the shaft 44 carries a gear 51 which idles thereon and above this gear 51, there is a gear 52 which is keyed to the shaft 44. It will also be noted that the upper end of the shaft 43 has keyed thereto a gear 54 in constant mesh with the smallest driving gear 30. The upper end of the shaft 44 has keyed thereto a gear 55 in constant mesh with the intermediate sized driving gear 29.

Referring briefly to Figs. 6 and 7, the shaft 42 carries thereon an idle gear 57 and above this idle gear 57, there is keyed to the shaft 42 a gear 56. The upper end of the shaft 42 has keyed thereto a gear 59 in constant mesh with the largest driving gear 28.

The stud 46 has slideably mounted thereon a sleeve 61 (see Figs. 3, 5, 7 and 9). This sleeve carries two radially projecting arms 62, 63 which are apertured to surround the spool 40 and support therebetween a central shiftable transfer gear 65 which is slideably keyed, as at 66 to the spool 40. This gear 65 is normally urged toward a central position on the spool 40 by opposed coil springs 67, 68 bearing on the corresponding arms 62, 63 and against flanges 69, 69a at the ends of the spool 40.

The outer edge of the sleeve 61 (see Fig. 9) has an outwardly projecting detent 72. This detent laps the pawls 73, 73a which are spring urged inwardly across the vertical path of movement of the detent 72. These pawls are positioned such as to index the sleeve 61, and the gear 65 carried thereby, in the three positions of adjustment corresponding to the driving speeds imparted by the driving gears 28, 29, 30. Without the indexing mechanism, and by reason of the more or less conventional chamfer at the side edges of gear teeth, there were apt to occur potential dead spots where there would be no engagement between the gear teeth at certain positions of the chuck jaws in clamped position on an inserted tool, drill or the like. However, with the indexing mechanism, as the spool 40 is shifted, upon adjustment of the chuck, the detent 72 will urge an adjacent pawl 73 or 73a inwardly against the action of the corresponding spring so that when the detent passes the end of the pawl, the spring will urge the pawl outwardly and, acting on the adjacent surface of the detent, will shift the entire sleeve yoke and gear assembly a sufficient distance to pass any potential dead spot.

Figures 4, 5:
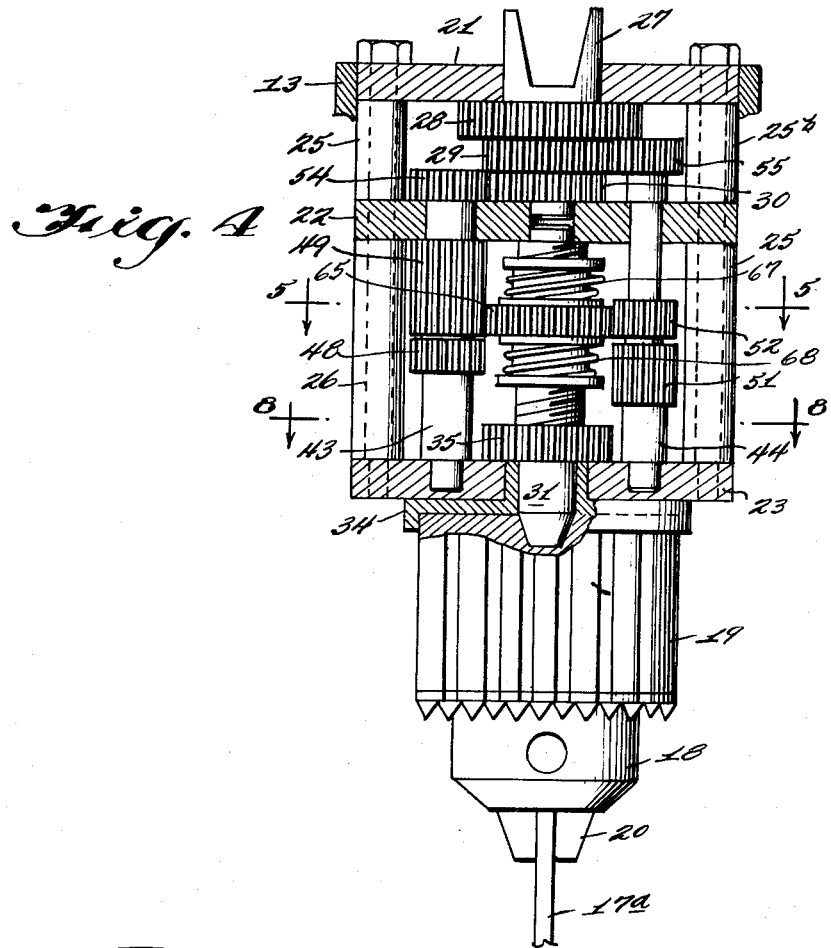
Fig. 4 is a view, similar to Fig. 2, but showing the shiftable center gear and spool in another position to illustrate the position of the train of gearing for rotating a drill of lesser and intermediate size at an increased speed.
Fig. 5 is a sectional view taken substantially along the line 5—5 of Fig. 4.
Figure 9:
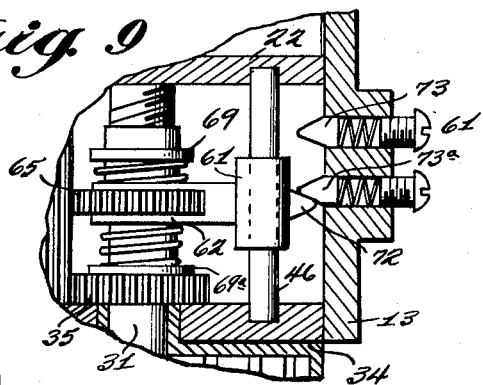
Fig. 9 is a fragmentary sectional view, taken substantially along the line 9—9 of Fig. 5, showing one form of indexing device for locating the shiftable central gear in its various positions of adjustment.

Briefly, when the chuck body 18 and adjusting sleeve 19 are relatively adjusted to bring the jaws 20 into engagement with an inserted tool shank, rotation is imparted to the driven shaft 31 and this, in turn, will effect axial shifting of the spool 40 relative to the threaded shaft 31 by reason of the threaded interconnection therebetween. Thus, in the tightening adjustment of the chuck jaws to the smallest inserted tool, the spool 40 will be caused to move toward its topmost position (see Fig. 6) and in the opening movement of the jaws to clamp the largest size inserted tool, the spool 40 will be moved toward its lowermost position (see Fig. 2). There is an intermediate position of Fig. 4 and, as indicated above, only three speeds have been shown for simplicity of illustration and description of operation. In the position of Fig. 2, that is, the lowermost position of the spool 40, the detent 72 (see Fig. 9), will engage beneath the spring pressed pawl 73a. In the intermediate position of the spool 40, as shown in Fig. 4, the detent 72 will be positioned between the spring urged pawls 73, 73a. In the topmost position of the spool 40 (see Fig. 6), the detent 72 will be positioned above the spring urged pawl 73.

In Fig. 2, the chuck jaws 20 have been positioned in engagement with the relatively large size drill 17 and in this position, the spool 40 is in its lowermost position. The gear 65 is in engagement with the gear 48 keyed in position on shaft 43. The smaller driving gear 30 is in mesh with the gear 54 also keyed to the shaft 43 so that the drive to the driven shaft 31 is through the meshing gears 30, 54 and 48, 65. The gear 65 is also in mesh with the idle gear 51 on shaft 44 and the idle gear 57 on shaft 42 and the idle pinion 37 which, as indicated above, is always in mesh with the gear 35. Thus, during driving of the chuck from the spindle, there will be no loosening of the chuck jaws because the gear 35 and the gear 65 are rotated in unison. The driving connection of Fig. 2 is for a relatively slow speed for the relatively large spindle 17.

Referring to Fig. 4, the chuck jaws 20 have been tightened to engage in an intermediate size drill 17a and with this adjustment, the spool 40, by reason of its threaded connection with the driven shaft 31, will have been moved to the position shown in Fig. 4. In this position, the gear 65 is in mesh with the gear 49 which idles on shaft 43. The gear 65 is also in mesh with the gear 52 which is keyed on shaft 44 and is driven from the driving gear 29 through gear 55 also keyed on shaft 44. Thus, for this intermediate speed, the drive to the driven shaft 31 is through the meshing gears 29, 55 and 52, 65. As previously indicated, the gear 65 continues in mesh with the elongated idle gear 37 to effect comparable rotation of the gear 35 and thus prevent any alteration of the clamping effect of the chuck jaws on the inserted tool or drill. Likewise, gear 65 is in mesh with idle gear 57 on shaft 42.

For the position of the parts with the chuck jaws 20 gripping the small size drill 17b, reference is made to Fig. 6 wherein the spool 40 has been shifted to its uppermost position with the gear 65 meshing with gear 56 keyed on shaft 42 which is driven through gear 59 in mesh with the larger driving gear 28. The gears 65 and 35 continue to rotate in unison by reason of their connection through the idle pinion 37. Gear 65 is also in mesh with idle gear 49 on shaft 43.

Figure 10:
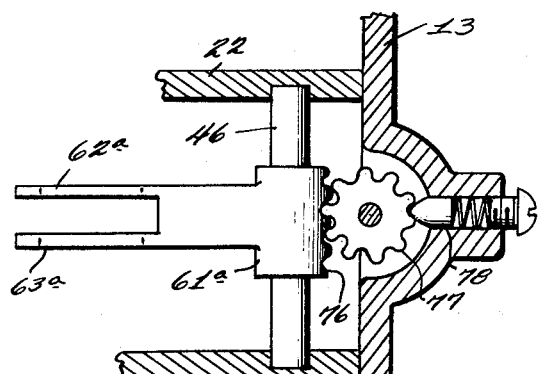
Figs. 10 and 11 are horizontal enlarged fragmentary views showing two modified forms of indexing mechanism.
Figure 11:
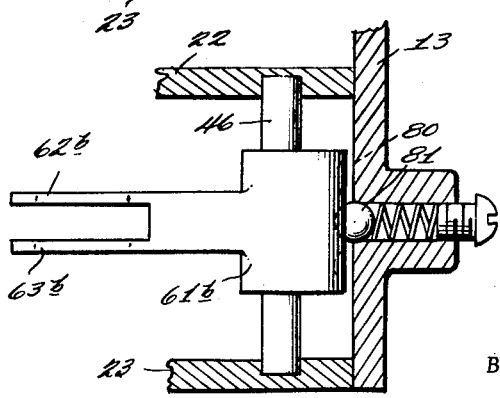

Modified forms of indexing arrangements are shown in Figs. 10 and 11. In Fig. 10, the sleeve 61a of the yoke is provided with rack teeth 76 meshing with gear 77 pivoted in the housing. Indexing in the several positions is accomplished by a spring pressed detent or pawl 78 engaging between adjacent teeth on the gear 77. In Fig. 11, the comparable edge of the sleeve 61b of the yoke is provided with spaced recesses 80 into which a spring pressed ball 81 is spring urged for indexing the yoke in the illustrated three speed positions.

In Fig. 6, there is shown the means for attachment of the device to a fixed part of the drill press, such as the bracket 10. Thus, the plate 21 has an arm extension 21a carrying a bolt 83 and spacer 84, the bolt adapted for attachment to the press bracket, thus to prevent rotation of the housing and assembly enclosed therein.

From the foregoing description, it will be seen that the present invention provides an efficient and compact variable speed mechanism in association with forms of conventional chuck devices by the adjustment of which, in clamping tools or drills of various sizes, the variable speed mechanism is automatically set at a predetermined position for rotating the chuck from the drill spindle at a speed desirable for the particular size of tool clamped by the chuck. Though only three speeds have been illustrated and described for simplification, it is of course understood that the stack of driving gears may be increased in number and varied in size for various speed selections and further, the mechanism which is shiftable in accordance with the radial or peripheral position of the tool gripping means of the chuck may be employed in connection with frictional or belt drives to give an infinitely variable speed variation.

While one form of variable speed mechanism has been shown, along with certain alternate forms of indexing mechanisms, it is to be clearly understood that various changes in the details of construction, arrangement of parts and mode of operation may be made without departing from the spirit and scope of the invention as set forth in the appended claims.

I claim:

1. In a machine tool having rotary chuck means with shiftable holding means for gripping an element to be rotated thereby; driving means for rotating said chuck means, and means responsive to movement of said holding means to element gripping position for varying the speed of rotation of said chuck means in accordance with the size of the portion of the element gripped thereby.

2. In a machine tool having rotary chuck means with shiftable holding means for gripping an element to be rotated thereby; driving means for rotating said chuck means and means responsive to the peripheral position of said holding means in element gripping position for selecting the speed at which said chuck means is rotated in accordance with the size of the portion of the element gripped thereby.

3. In a machine tool having rotary chuck means with shiftable holding means for gripping an element to be rotated thereby; driving means for rotating said chuck means, a variable speed drive mechanism operatively interconnecting said driving means and said chuck means, and means responsive to movement of said holding means into engagement with the element gripped thereby for setting the variable speed drive mechanism.

4. In a machine tool as claimed in claim 3, wherein the means for setting the variable speed drive mechanism comprises means shiftable between the driving means and the chuck means in accordance with the position of said holding means when gripping the elements to be rotated thereby.

5. In a machine tool having rotary chuck means with shiftable holding means for gripping tool stems having peripheral dimensions differing substantially in accordance with the tool sizes; driving means for rotating said chuck means, and means responsive to movement of said holding means into engagement with the particular size of tool stem gripped thereby for correspondingly varying the speed of rotation of said chuck means.

6. In a machine tool as claimed in claim 5, wherein there is provided a variable speed drive connection between the driving means and said chuck means and including a member shiftable in accordance with movement of said holding means for varying the speed of rotation of said chuck means in accordance with the particular size of tool stem gripped thereby.

7. A machine tool having a rotary chuck with shiftable holding means for gripping tool stems of different peripheral dimensions, a driving spindle, means including a variable speed drive mechanism connecting said driving spindle with said chuck, and means responsive to the peripheral position of said holding means in engagement with a tool stem for selectively conditioning the variable speed drive mechanism to rotate the chuck at a speed in accordance with the tool stem dimension of the particular tool gripped thereby.

8. A machine tool as claimed in claim 7, wherein the conditioning means for the variable speed drive mechanism includes a member shiftable in accordance with movement of said holding means into gripping engagement with a tool stem to be rotated thereby.

9. A machine tool as claimed in claim 8, wherein the shiftable member is movable axially of the holding means in accordance with the radial position of said holding means engaging a tool stem.

10. A machine tool comprising a rotary chuck with shiftable holding means for gripping elements of different sizes, drive means for rotating said chuck, and means for varying the speed of rotation of said chuck and including means responsive to the position of said holding means in gripping engagement with an element to be rotated thereby.

11. A machine tool as claimed in claim 10, wherein the holding means has at least a radial component of movement, and wherein the means for varying the speed of rotation of the chuck includes a member shiftable in response to the radial movement of said holding means.

12. A machine tool as claimed in claim 11, wherein the chuck includes rotatable adjusting means for positioning the holding means, and wherein the shiftable member is moved in accordance with rotation of said rotatable adjusting means.

13. A variable speed rotary chuck for use in a machine tool or the like, and comprising peripherally contractable and expansible holding means for gripping elements of varying sizes, a drive connection for attachment to a driving spindle, a variable speed drive mechanism interconnecting the drive connection with said chuck, and means responsive to movement of the holding means into gripping engagement with an element to be rotated thereby for setting the variable speed drive mechanism at a speed corresponding to the size of the gripped element.

14. A variable speed rotary chuck for use in a machine tool or the like, and comprising peripherally contractable and expansible holding means for gripping elements of varying sizes, a drive connection for attachment to a driving spindle, a variable speed drive mechanism interconnecting the drive connection with said chuck, and means shiftable in accordance with the peripheral position of said holding means for varying the speed at which said chuck will be driven from the drive connection.

15. A variable speed rotary chuck as claimed in claim 14, wherein there are provided a plurality of gear paths each for a different speed of rotation of the chuck, and wherein there is a common gear shiftable in accordance with the position of the holding means in gripping engagement with the gripped element for selecting the gear path speed for that particular element.

16. A variable speed rotary chuck as claimed in claim 15, wherein said common gear is carried by a sleeve for shifting the same, and wherein the sleeve is shiftable in accordance with movement of the holding means into gripping engagement with the element.

17. A variable speed rotary chuck for use in a machine tool or the like, and comprising peripherally shiftable holding means for gripping elements of varying sizes to be rotated thereby, a drive connection for attachment to a driving source, a variable speed drive mechanism interconnecting the drive connection with said holding means and including a member shiftable in accordance with the position of the holding means in gripping engagement with an element to be rotated thereby, and a member driven from said drive connection and shiftable with said shiftable member for varying the speed of rotation of the chuck in accordance with the gripping position of said holding means.

18. A variable speed rotary chuck as claimed in claim 17, wherein the driven member comprises a shiftable gear, and wherein there are provided counter shafts having gears thereon to be selectively engaged by said shiftable gear to vary the speed of rotation of the chuck.

19. A variable speed rotary chuck as claimed in claim 17, wherein there is provided a threaded rotary driven shaft threadedly engaging the shiftable member for shifting the same in accordance with the gripping position of said holding means.

20. A variable speed rotary chuck as claimed in claim 19, wherein there is provided indexing means to assist in positioning the shiftable gear in its various speed determining positions.

References Cited in the file of this patent

UNITED STATES PATENTS

| | | |
|---|---|---|
| 1,281,629 | Monahan | Oct. 15, 1918 |
| 2,534,951 | Cargill | Dec. 19, 1950 |

FOREIGN PATENTS

| | | |
|---|---|---|
| 758,135 | Great Britain | Sept. 26, 1956 |
| 764,671 | Great Britain | Dec. 28, 1956 |